(12) United States Patent
Miura

(10) Patent No.: US 7,754,392 B2
(45) Date of Patent: Jul. 13, 2010

(54) FUEL CELL SYSTEM AND FUEL GAS CONTROL METHOD

(75) Inventor: Shimpei Miura, Rancho Palos Verdes, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 883 days.

(21) Appl. No.: 10/585,347

(22) PCT Filed: Jan. 12, 2005

(86) PCT No.: PCT/IB2005/000050

§ 371 (c)(1),
(2), (4) Date: Jul. 27, 2006

(87) PCT Pub. No.: WO2005/069417

PCT Pub. Date: Jul. 28, 2005

(65) Prior Publication Data

US 2008/0008921 A1    Jan. 10, 2008

(30) Foreign Application Priority Data

Jan. 13, 2004    (JP) .............................. 2004-005858

(51) Int. Cl.
H01M 8/04    (2006.01)

(52) U.S. Cl. ...................................... 429/442; 429/433

(58) Field of Classification Search ....................... None
See application file for complete search history.

(56) References Cited

U.S. PATENT DOCUMENTS

| | | |
|---|---|---|
| 2001/0014415 A1 | 8/2001 | Iio et al. |
| 2002/0094469 A1 | 7/2002 | Yoshizumi et al. |
| 2003/0022041 A1 | 1/2003 | Barton et al. |
| 2003/0027024 A1 | 2/2003 | Iio et al. |
| 2004/0219406 A1* | 11/2004 | Sugawara et al. .............. 429/22 |

FOREIGN PATENT DOCUMENTS

| | | |
|---|---|---|
| EP | 1 187 241 A2 | 3/2002 |
| FR | 2 831 994 | 5/2003 |
| JP | A 2-87479 | 3/1990 |
| JP | A 2000-243417 | 9/2000 |
| JP | A 2002-8691 | 1/2002 |
| JP | A 2002-289237 | 10/2002 |
| JP | A 2003-317752 | 11/2003 |
| WO | WO 2004/051780 A2 | 6/2004 |
| WO | WO 2004/105165 A2 | 12/2004 |

* cited by examiner

*Primary Examiner*—John S Maples
(74) *Attorney, Agent, or Firm*—Oliff & Berridge, PLC

(57) ABSTRACT

A nitrogen concentration of fuel gas is estimated, and an amount of discharged fuel off-gas that is discharged from a fuel off-gas passage to outside by a discharging mechanism is controlled depending on the estimated nitrogen concentration. The nitrogen concentration, for example, can be estimated from a rate of pressure drop in the fuel off-gas passage during the discharge of fuel off-gas.

15 Claims, 5 Drawing Sheets

FUEL CELL SYSTEM AND FUEL GAS CONTROL METHOD

This application is a 371 of PCT/IB05/00050, filed 12 Jan. 2005, which claims priority of Japanese 2004-005858, filed 13 Jan. 2004.

BACKGROUND OF THE INVENTION

1. Field of the Invention

The invention relates to a fuel cell system, and in particular, relates to art for controlling an amount of fuel off-gas discharged from a fuel cell system to outside.

2. Description of the Related Art

A fuel cell has a structure in which an anode and a cathode are arranged with an electrolyte membrane therebetween. An electrochemical reaction occurs when fuel gas including hydrogen contacts the anode, and oxidation gas including oxygen from air or the like contacts the cathode, thus generating an electromotive force. For a fuel cell system that obtains electric power using such a fuel cell, eliminating excessive consumption of hydrogen fuel is important from the standpoint of energy conservation. To this end, a fuel cell system such as that disclosed in, for example, Japanese Patent Application Publication No. JP-A-2002-289237, circulates off-gas of fuel gas used by the fuel cell through the fuel cell again in order to effectively use hydrogen remaining in the fuel off-gas.

Moreover, fuel gas supplied to the anode and oxidation gas flowing to the cathode are separated by the electrolyte membrane. A portion of the fuel gas passes through the electrolyte membrane to the cathode side; conversely, a portion of the oxidation gas passes through the electrolyte membrane to the anode side. The oxidation gas emerging on the anode side includes fuel off-gas and is circulated through the fuel cell. However, the main component of the oxidation gas is inert nitrogen, which builds up in the fuel gas circulation system, thus gradually increasing the concentration of nitrogen in the fuel gas supplied to the fuel cell. This increase in the nitrogen concentration of fuel gas also suggests a decrease in the hydrogen concentration, which may lower the power generation performance of the fuel cell.

With regard to this point, art disclosed in Japanese Patent Application Publication No. JP-A-2002-289237 opens a valve communicating with a fuel off-gas passage for a predetermined period, when the concentration of impurities in the circulating fuel gas reaches an intolerable level. Thus, nitrogen accumulated in the circulation system is discharged from the circulation system together with fuel off-gas, allowing the restoration of the hydrogen concentration in the fuel gas supplied to the fuel cell.

However, the open time of the valve is fixed in the above art, and therefore, a sufficient amount of nitrogen may not be discharged depending on the state of accumulated nitrogen in the circulation system. Thus, the hydrogen concentration may not adequately recover. Furthermore, hydrogen is also discharged from the circulation system together with nitrogen in the discharge of fuel off-gas. By leaving the valve open for a fixed period, as in the above art, more hydrogen than necessary may be discharged while the hydrogen concentration is restored, which may also lower fuel economy. Accordingly, when fuel off-gas is discharged outside the circulation system to restore the hydrogen concentration, the amount of discharged fuel off-gas must be accurately controlled so that hydrogen is not unnecessarily discharged.

In addition, the decrease in the fuel gas hydrogen concentration caused by nitrogen passing through the electrolyte membrane is not limited to only the type of fuel cell system that operates while circulating fuel gas as described above. For example, as disclosed in Japanese Patent Application Publication No. JP-A-2002-8691, this problem is also shared with anode dead end-type fuel cell systems that operate with the outlet of the fuel gas passage to the anode closed. In an anode dead end-type fuel cell system, fuel gas is supplied in accordance with the consumption of hydrogen on the anode side. However, since nitrogen passes through the electrolyte membrane and accumulates in the fuel gas passage to the anode, the hydrogen concentration in the anode gradually decreases. As a result, even in such an anode dead end-type fuel cell system, nitrogen accumulated in the fuel gas passage to the anode is discharged together with fuel off-gas outside the system, and an art for accurately controlling the amount of discharge at that time is required.

SUMMARY OF THE INVENTION

It is an object of the invention to provide a fuel cell system and fuel gas control method capable of accurately controlling an amount of discharged fuel off-gas, such that hydrogen is not unnecessarily discharged while a hydrogen concentration is being adequately restored. This object is solved by a fuel cell system comprising the features of claim 1 as a first aspect of the invention, and by a fuel gas control method comprising the features of claim 10 as a second aspect of the invention, respectively. Further developments are subject matter of the further claims.

In a the first aspect of the invention, the fuel cell system includes a fuel cell that receives a supply of fuel gas including hydrogen for generating electric power; a fuel off-gas passage that is a passage for discharging fuel off-gas from the fuel cell; a discharging mechanism that discharges the fuel off-gas from the fuel off-gas passage to outside; a nitrogen concentration estimation mechanism for estimating a nitrogen concentration of the fuel gas in the fuel cell; and a discharge amount control mechanism for controlling an amount of discharged fuel off-gas that is discharged by the discharging mechanism depending on the nitrogen concentration estimated by the nitrogen concentration estimation mechanism.

According to the first aspect, the amount of discharged fuel off-gas discharged from the fuel off-gas passage to outside is controlled depending on the nitrogen concentration of the fuel gas in the fuel cell, thus assuring an optimized amount of discharged fuel off-gas. Consequently, a decrease in fuel economy due to unnecessarily discharging hydrogen can be suppressed when restoring the hydrogen concentration by discharging fuel off-gas.

In the first aspect, the nitrogen concentration estimation mechanism can estimate the nitrogen concentration from a physical quantity related to the fuel off-gas detected in the fuel off-gas passage. In this case, the ultimate concentration of the nitrogen concentration, which varies depending on the position in the fuel cell, is reflected in the physical quantity related to fuel off-gas. Therefore, estimating the nitrogen concentration from the physical quantity detected in the fuel off-gas passage assures an accurate estimation of the nitrogen concentration of the fuel gas in the fuel cell.

In an aspect related to the first aspect, the nitrogen concentration estimation mechanism can estimate the nitrogen concentration from a rate of pressure drop in the fuel off-gas passage during discharge of the fuel off-gas by the discharging mechanism. In this case, the rate of pressure drop in the fuel off-gas passage during the discharge of fuel off-gas corresponds to the nitrogen concentration. Therefore, estimating the nitrogen concentration from the rate of pressure drop assures an accurate estimation of the nitrogen concentration of the fuel gas in the fuel cell. Furthermore, the nitrogen concentration can also be estimated from the hydrogen concentration. However, the pressure sensor required for measuring the rate of pressure drop excels over a gas concentration sensor in terms of response. Therefore, according to the invention, the amount of discharged fuel off-gas can be accurately controlled as soon as the nitrogen concentration changes, as compared to using a detection value of the gas concentration sensor.

In the first aspect and a related aspect, the discharge amount control mechanism can decrease the amount of discharged fuel off-gas in proportion to an increase in the nitrogen concentration when the discharging mechanism is operated while the operation of the fuel cell is stopped. In this case, discharging the fuel off-gas to decrease a hydrogen pressure in the anode is effective for suppressing the permeation of hydrogen to the cathode while the operation of the fuel cell is stopped. However, decreasing the amount of discharged fuel off-gas as the nitrogen concentration of the fuel gas increases prevents the unnecessary discharge of hydrogen when the hydrogen pressure in the anode is small to suppress a decrease in fuel economy.

In the first aspect and a related aspect, the fuel off-gas passage can be connected to a fuel gas passage, which is a passage for supplying the fuel gas to the fuel cell. In this case, a fuel gas circulation system is constructed when the fuel off-gas passage is connected to the fuel gas passage, and nitrogen accumulates in the circulation system. However, the hydrogen concentration is restored by discharging the fuel off-gas outside the circulation system. Moreover, the discharged amount is controlled in accordance with the nitrogen concentration of the fuel gas; therefore, a decrease in fuel economy due to unnecessarily discharging hydrogen can be suppressed.

In the first aspect and a related aspect, the discharge amount control mechanism can set an open time of a purge valve for discharging fuel off-gas to outside longer in proportion to an increase in the nitrogen concentration of the fuel gas in the fuel cell.

In the first aspect, the nitrogen concentration estimation mechanism can use at least one of the following in order to estimate the nitrogen concentration: a pressure sensor that detects a pressure loss between fuel gas entering and exiting the fuel cell, a pressure sensor that detects a pressure in the fuel off-gas passage, a hydrogen sensor that detects a hydrogen concentration in the fuel off-gas passage, an ultrasonic sensor that detects a sound velocity of fuel off-gas in the fuel off-gas passage, and a voltage monitor that detects a voltage of the fuel cell.

In the first aspect, the nitrogen concentration estimation mechanism can estimate the nitrogen concentration based upon a lapsed period after performing purging to discharge fuel off-gas to outside.

In the first aspect, the nitrogen concentration estimation mechanism can estimate the nitrogen concentration by operating the purge valve for discharging fuel off-gas to outside for a fixed open time in fixed cycles, and calculating a difference between a theoretical hydrogen consumption amount at that time and an actual hydrogen consumption amount.

In a second aspect of the invention, a fuel gas control method includes the steps of supplying fuel gas including hydrogen to a fuel cell to generate power; discharging fuel off-gas to outside from a fuel off-gas passage that is a passage for discharging fuel off-gas from the fuel cell; estimating a nitrogen concentration of the fuel gas in the fuel cell; and controlling an amount of discharged fuel off-gas that is discharged to outside depending on the estimated nitrogen concentration.

DETAILED DESCRIPTION OF THE PREFERRED EMBODIMENTS

Hereinafter, an embodiment of the invention will be described with reference to FIGS. 1 to 3.

A fuel cell system according to the invention may, for example, be applied to other automotive fuel cell systems mounted in vehicles; however, it can also be applied to fuel cell systems for other purposes.

[Description of Fuel Cell System Structure]

Figure 1:
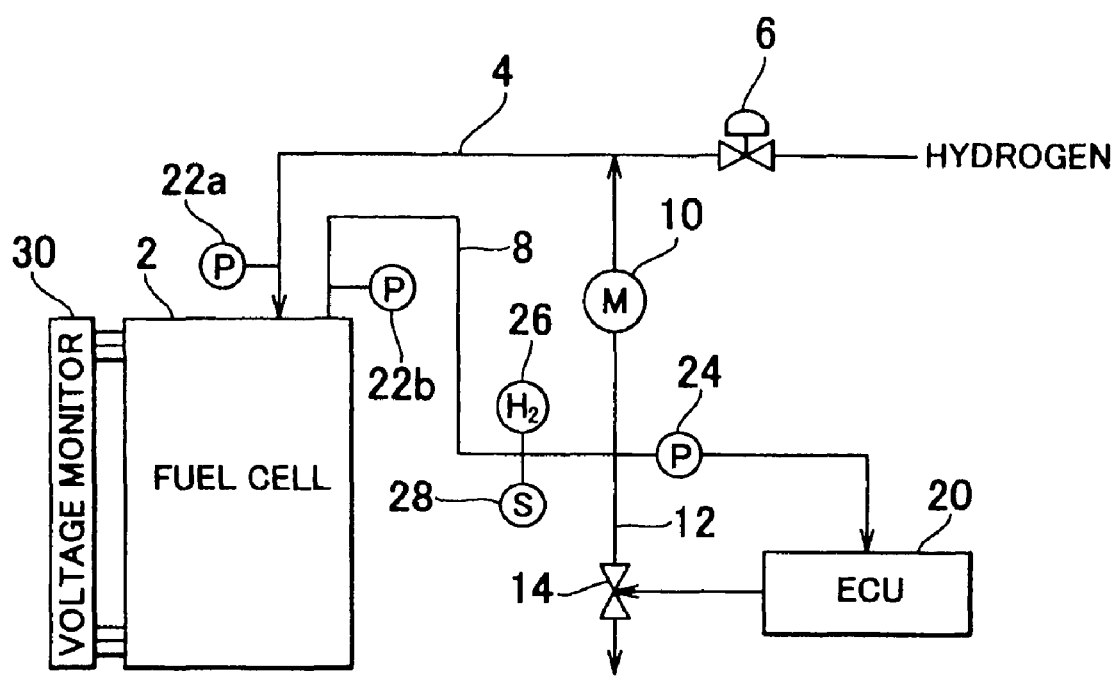
FIG. 1 is a drawing showing a schematic structure of a fuel cell system serving as an embodiment of the invention.

FIG. 1 is a drawing showing a schematic structure of a fuel cell system serving as a first embodiment of the invention. As shown in the figure, the fuel cell system has a fuel cell 2 serving as an electric power supply mechanism. The fuel cell 2 is structured with an electrolyte membrane permeable to hydrogen ions sandwiched between an anode and a cathode, which are catalytic electrodes (the electrolyte membrane, anode, and cathode are omitted in the figure). Electricity is generated by supplying fuel gas including hydrogen to the anode, and supplying oxidation gas including oxygen from the air or the like to the cathode.

A fuel gas passage 4 is connected to an anode inlet of the fuel cell 2. A fuel gas supply device (not shown) such as a hydrogen tank or reformer is connected to the fuel gas passage 4 on its upstream side. The fuel cell 2 receives a supply of fuel gas from the fuel gas supply device. A regulating valve 6 is provided in the fuel gas passage 4, and fuel gas supplied from the fuel gas supply device is supplied to the fuel cell 2 after being lowered and regulated to a desired pressure by the regulating valve 6.

In addition, a fuel off-gas passage 8 for discharging off-gas of fuel gas (fuel off-gas) is connected to the fuel cell 2. The downstream side of the fuel off-gas passage 8 is connected to the downstream side of the regulating valve 6 in the fuel gas passage 4 via a mixing device such as an ejector (not shown). Provided in the fuel off-gas passage 8 is a pump 10, and fuel off-gas is drawn into the fuel off-gas passage 8 from the fuel cell 2 through driving by the pump 10. The fuel off-gas is then sent back into the fuel gas passage 4. Thus in the fuel cell system, fuel gas is circulated through the fuel gas passage 4 and the fuel off-gas passage 8 during operation of the fuel cell 2.

An exhaust passage 12 for discharging fuel off-gas to outside the circulation system is connected to the upstream side of the pump 10 in the fuel off-gas passage 8. A purge valve 14 is provided in the exhaust passage 12. The purge valve 14 is normally closed; it is opened as necessary depending on the input of a control signal from an ECU (electronic control unit) 20 described later. For a purge valve 14, any valve capable of controlling the amount of discharged fuel off-gas, such as a shut-off valve or flow regulating valve may be used. In the embodiment, a shut-off valve is provided as the purge valve 14.

It should be noted that an oxidation gas passage for supplying oxidation gas is connected to the cathode inlet of the fuel cell 2; and an oxidized off-gas passage for discharging off-gas of oxidation gas is connected to the cathode outlet. However, these passages are not shown in FIG. 1, as they are not distinctive features of the fuel cell system.

In such a fuel cell system type where fuel gas is circulated, oxidation gas on the cathode side passes through the electrolyte membrane to emerge on the anode side in accordance with the operation of the fuel cell 2. Therefore, nitrogen included in the oxidation gas accumulates in the circulation system, and the nitrogen concentration of the fuel gas gradually increases. Hence, in this fuel cell system, the nitrogen concentration of the fuel gas in the fuel cell 2 is estimated, in order to prevent a decrease in the power generation performance of the fuel cell 2 that accompanies an increase in nitrogen concentration. Operation of the purge valve 14 is then controlled in accordance with the estimated nitrogen concentration. Hereinafter, a control method for the purge valve 14 and a nitrogen concentration estimation method according to the embodiment will be described in detail.

[Description of Nitrogen Concentration Estimation Method]

The fuel cell system includes the ECU 20 as a control device for controlling the purge valve 14. At least one of the following is connected to an input side of the ECU 20: A pair of pressure sensors 22a, 22b provided in the anode inlet and outlet for detecting a pressure-loss between fuel gas entering and exiting the fuel cell 2; a pressure sensor 24 provided near the purge valve 14 in the fuel off-gas passage 8 for detecting a pressure inside the fuel off-gas passage 8; a hydrogen sensor 26 provided in the fuel off-gas passage 8 for detecting a hydrogen concentration of the fuel off-gas; an ultrasonic sensor 28 provided in the fuel off-gas passage 8 for detecting a sound velocity in the fuel off-gas; and a voltage monitor 30 for detecting a voltage of the fuel cell 2.

Each of the above sensors can be used as a mechanism for estimating the nitrogen concentration of fuel gas in the fuel cell 2. By providing pressure sensors 22a, 22b in the anode inlet and outlet, it is possible to estimate the nitrogen concentration using the different pressure losses of hydrogen and nitrogen. Due to differences in density and viscosity, the difference in hydrogen and nitrogen pressure loss can be almost fourfold. Therefore, when the nitrogen concentration of the fuel gas in the fuel cell 2 increases, the difference in the pressure between fuel gas entering and exiting the fuel cell 2 also increases. Accordingly, the nitrogen concentration can be estimated by using the pressure sensors 22a, 22b to detect the difference in pressure between fuel gas entering and exiting the fuel cell 2.

It is also possible to estimate the nitrogen concentration using the different pressure losses of hydrogen and nitrogen with the pressure sensor 24 provided in the off-gas passage 8. The nitrogen concentration of the fuel off-gas increases due to the difference in hydrogen and nitrogen pressure loss, which decreases the flow amount through the purge valve 14 at identical valve opening angles. Therefore, the rate of pressure drop in the fuel off-gas passage 8 decreases when the purge valve 14 is open. Accordingly, the nitrogen concentration can be estimated by detecting output changes of the pressure sensor 24 when the purge valve 14 is open.

When the hydrogen sensor 26 is used, the nitrogen concentration can be calculated from the hydrogen concentration detected by the hydrogen sensor 26. The hydrogen concentration decreases in accordance with the increase in the nitrogen concentration of the fuel off-gas; therefore, the nitrogen concentration can be estimated by detecting the hydrogen concentration.

Using the sonic sensor 28, the nitrogen concentration can be estimated based upon the fact that the sound velocity of the fuel off-gas varies due to a disparity of components of the fuel off-gas. When the nitrogen concentration of the fuel off-gas increases, the sound velocity of the fuel off-gas also changes accordingly. Therefore, the nitrogen concentration can be estimated by detecting the sound velocity of the fuel off-gas.

It should also be noted that since fuel gas in the fuel cell system is circulated, if the hydrogen sensor 26 or the sonic sensor 28 is used as the method for estimating the nitrogen concentration, it is also possible to estimate the nitrogen concentration of fuel gas in the fuel cell 2 by detecting the hydrogen concentration or the sound velocity in the fuel gas passage 4.

Furthermore, if there is a purge value in the fuel gas passage 4, the method for estimating the nitrogen concentration from the rate of pressure drop using the pressure sensor 24 can also estimate the nitrogen concentration from the rate of pressure drop when the purge valve is opened. However, the change in the nitrogen concentration of the fuel gas in the fuel cell 2 first becomes apparent through a change in the nitrogen concentration in the fuel off-gas passage 8, and then appears as a change in the nitrogen concentration in the fuel gas passage 4 when fuel off-gas is sent into the fuel gas passage 4. Consequently, by detecting fuel off-gas in the fuel off-gas passage 8 as described above, the nitrogen concentration of fuel gas in the fuel cell 2 can be estimated faster without delay as compared to detecting the fuel gas in the fuel gas passage 4.

Moreover, the nitrogen concentration of the fuel gas in the fuel cell 2 varies depending on its position in the fuel cell 2 (for example, the nitrogen concentration near the anode outlet is higher than that near the anode inlet). Since the final nitrogen concentration is reflected in the fuel off-gas, detecting the fuel off-gas also gives the advantage of accurately estimating the nitrogen concentration of fuel gas in the fuel cell 2.

When the voltage monitor 30 is used, the nitrogen concentration of the fuel gas in the fuel cell 2 can be estimated from a decrease in the voltage of the fuel cell 2 detected by the voltage monitor 30. This is because the hydrogen concentration, which is also the fuel, decreases in proportion to increases in the nitrogen concentration of the fuel gas, thus lowering the voltage of the fuel cell 2.

In the following description, the pressure sensor 24 is provided in the fuel off-gas passage 8 as a nitrogen concentration estimation mechanism. The ECU 20 estimates the nitrogen concentration of the fuel gas in the fuel cell 2 based upon an output signal from the pressure sensor 24 obtained according to the method described earlier. This method has the advantage of using only one sensor compared to the method that estimates the nitrogen concentration using a difference in the pressure between fuel gas entering and exiting the fuel cell 2.

Moreover, in a comparison of the use of the pressure sensor 24 and the hydrogen concentration sensor 26, the pressure sensor 24 excels over the hydrogen concentration sensor 26 in terms of response. Compared to using the detection value of the hydrogen concentration sensor 26, the pressure sensor 24 has the advantage of being able to accurately estimate the nitrogen concentration as soon as the nitrogen concentration of the fuel gas changes. Furthermore, nitrogen concentration estimation according to this method is performed in conjunction with the operation of the purge valve 14, unlike nitrogen concentration estimation according to other methods, which are performed independent of the operation of the purge valve 14.

[Description of Purge Valve Control Method]

Figure 2:
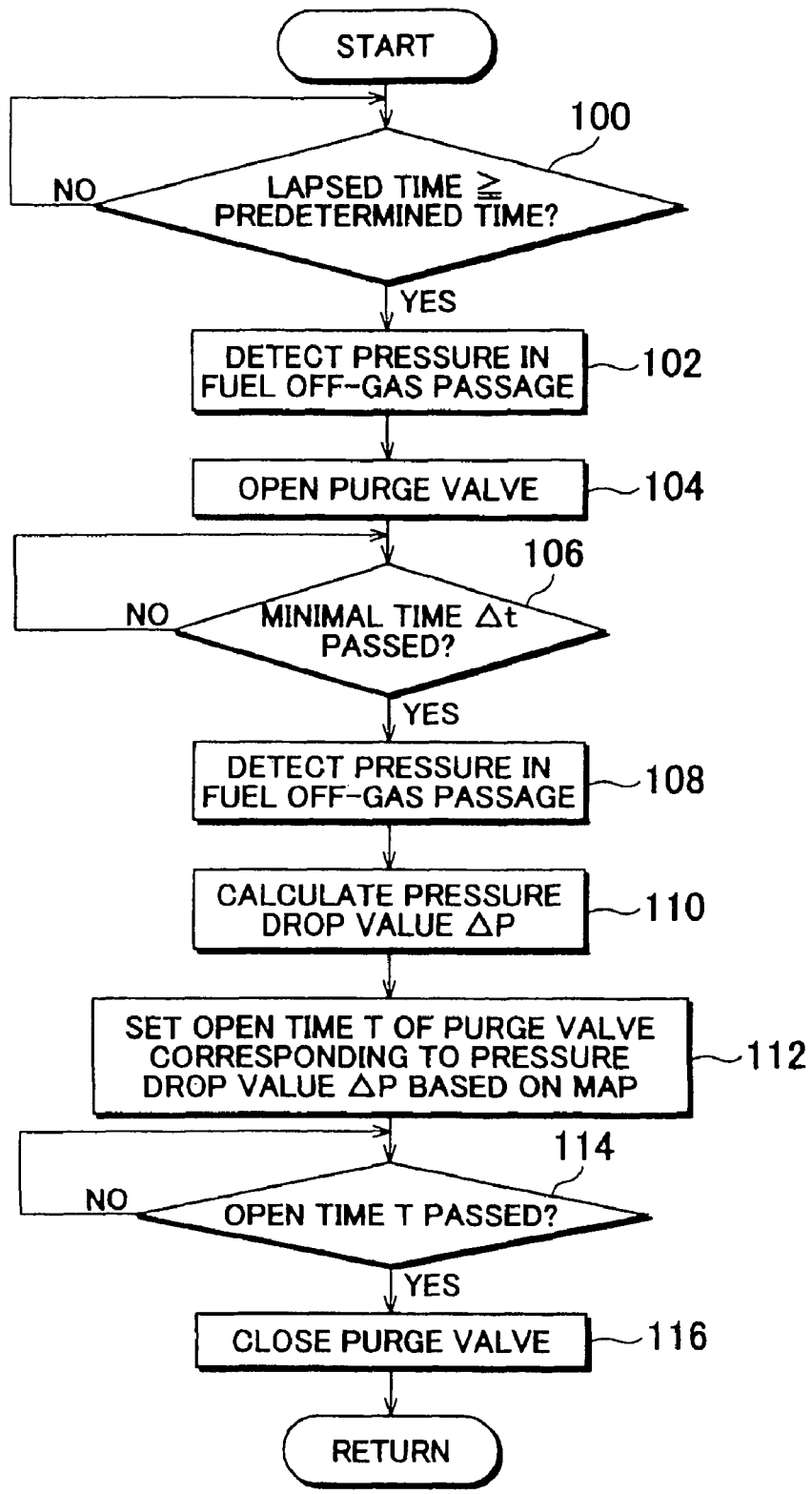
FIG. 2 is a flowchart of a purge control routine executed in the embodiment of the invention.

FIG. 2 is a flowchart showing a control flow by which the ECU 20 controls the purge valve 14 during operation of the fuel cell 2. The ECU 20 is designed to operate the purge valve 14 in fixed cycles. In step 100, the ECU 20 determines whether a lapsed time since a previous operation has reached a predetermined time. If it is determined in step 100 that the lapsed time has reached a predetermined time, the pressure in the fuel off-gas passage 8 at the present moment is detected by the pressure sensor 24 (step 102), and the purge valve 14 is subsequently opened (step 104).

Figure 3:
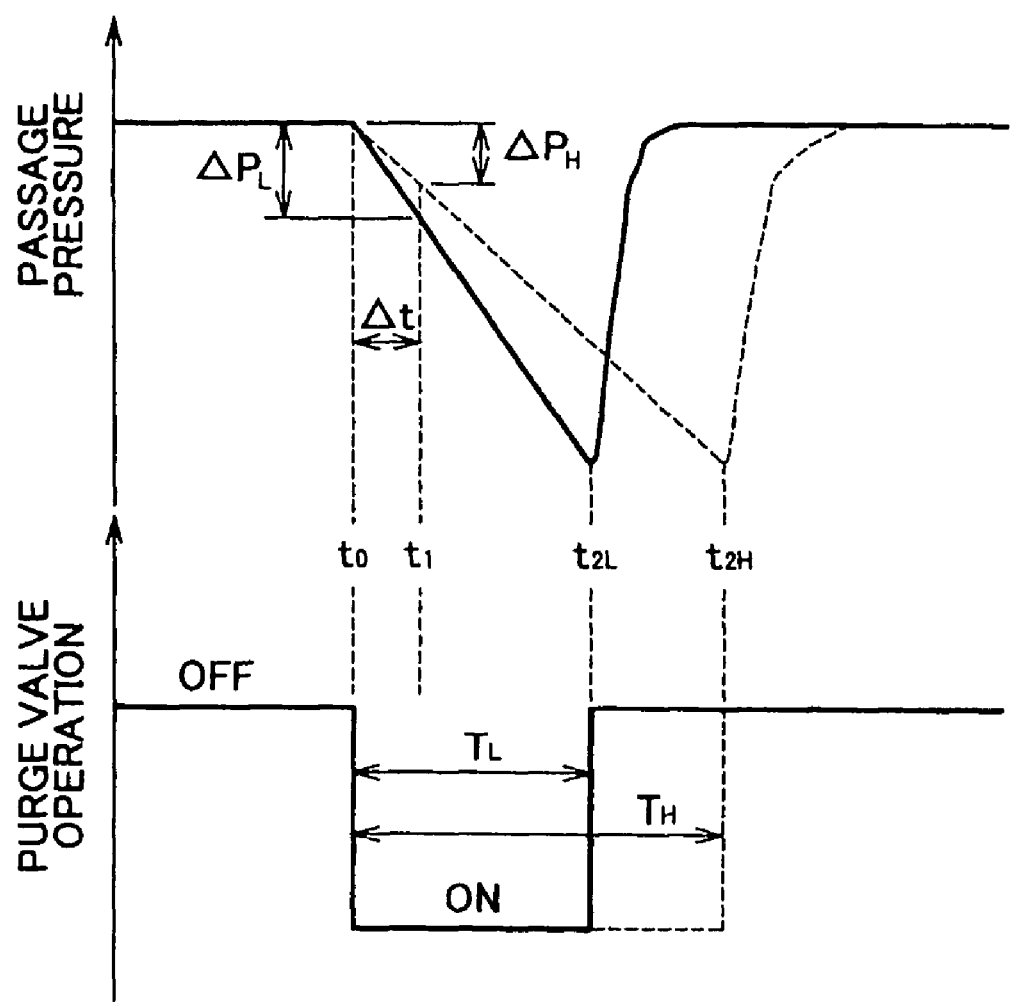
FIG. 3 is a graph showing a relationship between pressure changes in a fuel off-gas passage and the operation of a purge valve during execution of the purge control routine in FIG. 2.

FIG. 3 is a graph showing a relationship between pressure changes in the fuel off-gas passage 8 and the operation of the purge valve 14 during execution of the purge control routine in FIG. 2. Once the purge valve 14 is opened depending on the establishment of the condition in step 100 (time t0), the fuel off-gas in the fuel off-gas passage 8 is discharged outside via the purge valve 14, and the pressure in the fuel off-gas passage 8 gradually decreases. The rate of pressure drop in the fuel off-gas passage 8 at this time changes depending on the nitrogen concentration of the fuel off-gas as described earlier. If the nitrogen concentration is relatively low, the rate of pressure drop is relatively fast as indicated by the solid line in the figure. Likewise, if the nitrogen concentration is relatively high, the rate of pressure drop is relatively slow as indicated by the broken line in the figure. It should also be noted that the pressure in the fuel off-gas passage 8 before the purge valve 14 is opened actually varies when the nitrogen concentration is high or low, due to a pressure loss between fuel gas before entering and after exiting the fuel cell 2. For description purposes, the same pressure value regardless of the level of nitrogen concentration is shown in FIG. 3.

The ECU 20 determines whether a predetermined minimal time $\Delta t$ has passed since the purge valve 14 was opened (step 106). After the predetermined minimal time $\Delta t$ has passed (time t1), the pressure in the fuel off-gas passage 8 is detected again by the pressure sensor 24 (step 108). A pressure drop value $\Delta P$ during the minimal time $\Delta t$ is then calculated (step 110). Since the rate of pressure drop varies depending on the nitrogen concentration, a pressure drop value $\Delta PH$ when the nitrogen concentration is relatively high is smaller than a pressure drop value $\Delta PL$ when the nitrogen concentration is relatively low.

Next, using the pressure drop value $\Delta P$ found in step 110 as a physical quantity correlated to the nitrogen concentration of the fuel gas, the ECU 20 sets an open time T of the purge valve 14 corresponding to the pressure drop value $\Delta P$ based upon a map prepared in advance (step 112). The open time T of the purge valve 14 is set such that an open time TH when the nitrogen concentration is relatively high is longer than an open time TL when the nitrogen concentration is relatively low. In step 114, it is determined whether the open time T set in step 112 has passed since the purge valve 14 was opened. If the open time T has passed, the ECU 20 closes the purge valve 14 in step 116 (time t2H or time t2L). Closing the purge valve 14 stops the discharge of fuel off-gas from the fuel off-gas passage 8 to outside. After the discharge of fuel off-gas is stopped, the pressure in the fuel off-gas passage 8 is restored by replenishing hydrogen via the regulating valve 6.

As described above, the ECU 20 is designed to set the open time of the purge valve 14 longer as the nitrogen concentration of the fuel gas in the fuel cell 2 increases. As a result, when the nitrogen concentration is high, a considerable amount of fuel off-gas, is discharged. Therefore, nitrogen accumulated in the circulation system is sufficiently discharged, and the hydrogen concentration of the fuel gas is sufficiently restored by replenishing hydrogen according to the amount of discharged nitrogen. Conversely, when the nitrogen concentration is low, the amount of discharged fuel off-gas is limited, thereby preventing more hydrogen than necessary from being discharged. Thus according to the fuel cell system, the amount of discharged fuel off-gas can be optimized. It is also possible to improve both the power generation performance through restoration of the hydrogen concentration and the fuel economy by suppressing unnecessary discharge of hydrogen.

In the past, it was necessary to set the regulating value of the regulating valve 6 higher than required to consider the decrease in voltage caused by the increase in nitrogen concentration. However, according to the present fuel cell system, the increase in nitrogen concentration is suppressed as described above, therefore, the regulating value of the regulating valve 6 can be set lower than conventional values. Thus, the pressure on the electrolyte membrane of the fuel cell 2 is also lowered, resulting in longer preservation of the electrolyte membrane durability than in the past.

[Description of Purge Valve Control Method During Fuel Cell Down Time]

The ECU 20 also controls the purge valve 14 while the operation of the fuel cell 2 is stopped, in order to discharge fuel off-gas from the fuel off-gas passage 8 to outside. However, the reason for discharging fuel off-gas while the operation of the fuel cell 2 is stopped differs from that while the fuel cell 2 is operating: fuel off-gas is discharged in order to lower the hydrogen pressure of the fuel gas in the fuel cell 2. Similar to nitrogen emerging on the anode side from the cathode side, hydrogen flowing in the anode passes through the electrolyte membrane to emerge on the cathode side. The seepage of hydrogen to the cathode side also occurs while the operation of the fuel cell 2 is stopped, however, discharging this hydrogen from the cathode side to outside air is not preferable. Hence, hydrogen pressure in the anode is lowered by discharging fuel off-gas from the fuel off-gas passage 8 to outside, as a method of suppressing the seepage of hydrogen to the cathode side while the operation of the fuel cell 2 is stopped.

When operating the purge valve 14 while the operation of the fuel cell 2 is stopped, the ECU 20 detects the rate of pressure drop (a pressure drop value during a predetermined minimal time) in the fuel off-gas passage 8 when the purge valve 14 is open, similar to when the fuel cell 2 is operating. Converse to the control while the fuel cell 2 is operating, the open time of the purge valve 14 is shortened as the rate of pressure drop slows, that is, as the nitrogen concentration of the fuel gas increases, in order to decrease the amount of discharged fuel off-gas.

If the nitrogen concentration of the fuel gas is high, the hydrogen pressure in the anode is low. Therefore, the seepage of hydrogen to the cathode side can be suppressed without discharging large amounts of fuel off-gas. Moreover, discharging large amounts of fuel off-gas also unnecessarily discharges hydrogen, which decreases fuel economy. However, according to the fuel cell system, the purge valve 14 is controlled such that the amount of discharged fuel off-gas is decreased as the nitrogen concentration of the fuel gas increases as described above. Therefore, when the hydrogen pressure in the anode is small, unnecessary discharge of hydrogen is prevented, thus suppressing a decrease in fuel economy.

Modifications

An embodiment of the invention was described above, however, the invention is not limited to the above embodiment. Various modifications are possible that fall within the scope and intent of the invention. As an example, the following modifications may be performed.

In the above embodiment, a sensor is used as a mechanism for estimating nitrogen concentration; however, the nitrogen concentration can also be estimated without using a sensor. More specifically, a method can be used that estimates the nitrogen concentration from the time passed after purging. If the permeability rate of nitrogen passing through the electrolytes membrane is generally constant, the nitrogen concentration of fuel gas increases again at a constant rate after purging. Accordingly, by calculating the increase rate of the nitrogen concentration after purging in advance through tests or the like, the nitrogen concentration during the lapsed period after purging up to the present moment can be estimated. It should also be noted that the permeability rate of nitrogen passing through the electrolyte membrane changes depending on the temperature of the fuel cell 2. For this reason, it is preferable to set the increase rate of the nitrogen concentration using temperature as one parameter.

In addition, the nitrogen concentration can also be estimated by calculating the difference between a theoretical hydrogen consumption amount and an actual consumption amount when the purge valve 14 is operated for a fixed open time in fixed cycles. The theoretical hydrogen consumption amount can be calculated from the generated electric power of the fuel cell 2; the actual hydrogen consumption amount can be measured by providing a flow meter upstream of the regulating valve 6. The difference between the theoretical hydrogen consumption amount and the actual hydrogen consumption amount is the unused amount of hydrogen in power generation, and signifies the amount of hydrogen discharged from the purge valve 14 to outside. If the purge valve is open for a fixed time, the amount of hydrogen discharged from the purge valve 14 becomes less as the hydrogen concentration of the fuel gas decreases, i.e., as the nitrogen concentration of the fuel gas increases. Therefore, as the difference between the theoretical hydrogen consumption amount and the actual hydrogen consumption amount decreases, this indicates that the nitrogen concentration of the fuel gas is increasing.

In the above embodiment, the amount of discharged fuel off-gas is controlled by varying the open time of the purge valve 14. However, the amount of discharged fuel off-gas may also be controlled by varying the operation cycles of the purge valve 14. If the open time is identical, the discharged amount can be increased by shortening the operation cycle.

Use of a shut-off valve as the purge valve 14 was described in the above embodiment; however, the amount of discharged fuel off-gas can also be controlled by varying the opening angle of the valve if a flow regulating valve is used as the purge valve 14. Furthermore, when the purge valve 14 is a solenoid valve based on a duty control, the nitrogen concentration of the fuel gas may also be continuously estimated during operation of the purge valve 14, and the duty ratio of the solenoid valve may be varied in real time in accordance with changes in the nitrogen concentration during operation of the purge valve 14.

Figure 4:
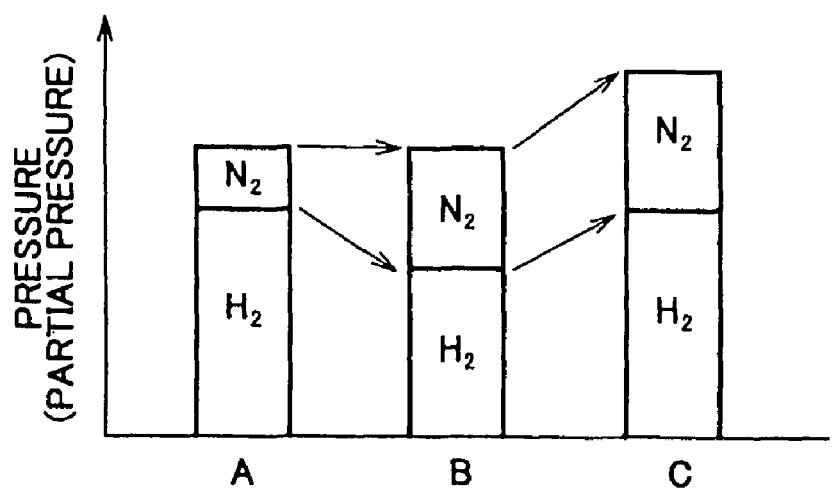
FIG. 4 is a conceptual diagram for describing a modification that is a control method for a fuel gas pressure regulating value.
Figure 5:
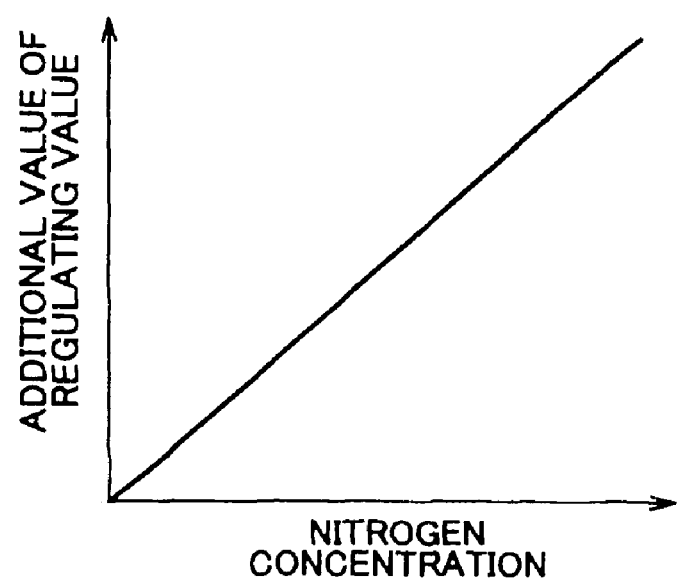
FIG. 5 is a map showing a relationship between a nitrogen concentration and an additional value of the pressure regulating value of a regulating valve according to the modification in FIG. 4.

In the above embodiment, the amount of discharged fuel off-gas is controlled in accordance with the estimated nitrogen concentration of the fuel gas. However, the amount of supplied fuel gas from the fuel gas supply device may be controlled instead. In the configuration shown in FIG. 1, the amount of supplied fuel gas is controlled by controlling the regulating value of the regulating valve 6 through the ECU 20. FIG. 4 is a drawing showing the concept of the control method. As clearly shown in a comparison of A and B in FIG. 4, the hydrogen pressure decreases in accordance with an increase in nitrogen pressure. In the control method, increasing the regulating value of the regulating valve 6 leaves the nitrogen pressure unchanged while increasing the hydrogen pressure as shown by C in FIG. 4, so that the hydrogen pressure can be maintained at a desired pressure. FIG. 5 is a map showing the relationship between the nitrogen concentration and an additional value for the regulating value of the regulating valve 6. The map is set such that the additional value of the regulating value increases as the nitrogen concentration increases. By thus maintaining the hydrogen pressure at a fixed value, it is possible to prevent a decrease in the power generation performance of the fuel cell 2.

Figure 6:
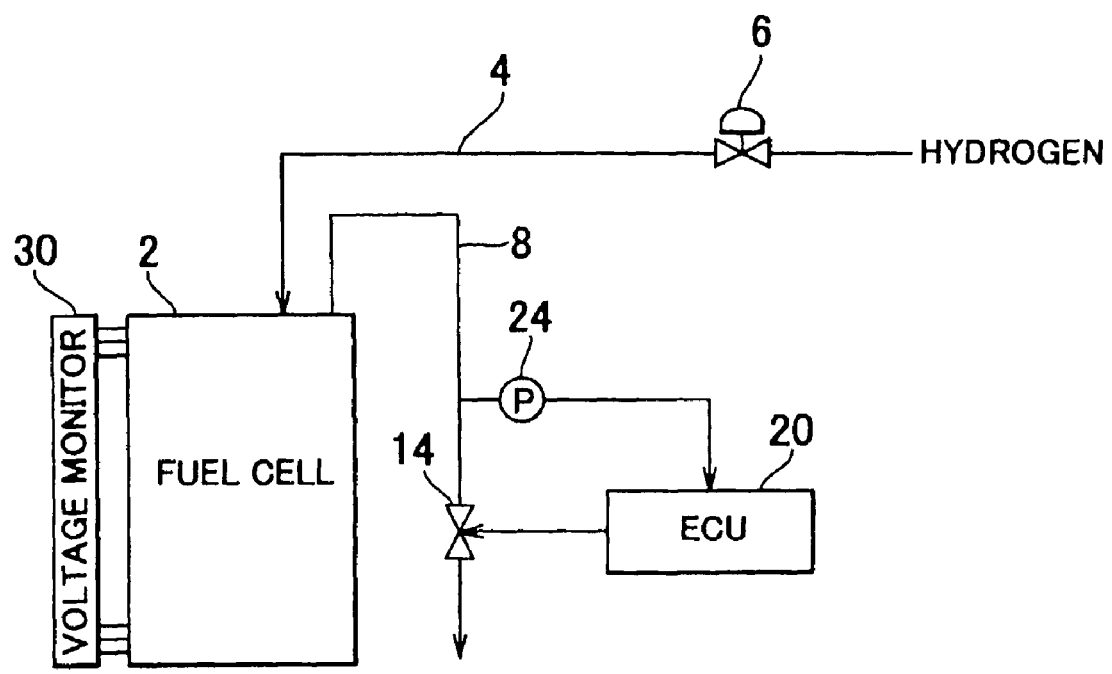
FIG. 6 is a drawing showing a schematic structure of another modification of the fuel cell system.

The invention is applied to a type of fuel cell system that circulates fuel gas in the above embodiment; however, the invention may also be applied to an anode dead-end type fuel cell system. FIG. 6 is a schematic diagram showing a configuration in which the invention is applied to an anode dead-end type fuel cell system. Like reference symbols are used in FIG. 6 for parts identical to that in the above embodiment.

In an anode dead-end type fuel cell system, the fuel cell is normally operated with the purge valve 14 closed, and there is very little flow of fuel gas near the anode outlet. Therefore, nitrogen permeating from the cathode side lingers on the anode outlet side, and ultimately stays in the fuel off-gas passage 8. Consequently, even in the anode dead-end type fuel cell system, the purge valve 14 must be periodically opened to discharge nitrogen accumulated in the anode of the fuel cell 2 to outside. In this case, the nitrogen concentration of the fuel gas in the fuel cell 2 is estimated, and the purge valve 14 is controlled according to the flowchart shown in FIG. 2. Thus, the amount of discharged fuel off-gas can be optimized similar to the above embodiment. It is also possible to improve both the power generation performance through restoration of the hydrogen concentration and the fuel economy by suppressing unnecessary discharge of hydrogen.

Note that in the anode dead-end type fuel cell system as well, it is preferable to detect the nitrogen concentration of the fuel gas from a physical quantity related to the fuel off-gas detected in the fuel off-gas passage 8. The configuration shown in FIG. 6 is designed such that the pressure sensor 24 provided in the off-gas passage 8 is used, and the nitrogen concentration is estimated by detecting pressure changes of the pressure sensor 24 when the purge valve 14 is open. As described above, the nitrogen permeating from the cathode side lingers on the anode outlet side, and ultimately stays in the fuel off-gas passage 8. For this reason, the nitrogen concentration in the fuel off-gas passage 8 is higher than that in the fuel gas passage 4. Therefore, the nitrogen concentration of the fuel off-gas in the fuel cell 2 can be accurately estimated by detecting the fuel off-gas.

A nitrogen concentration of fuel gas is estimated, and an amount of discharged fuel off-gas that is discharged from a fuel off-gas passage 8 to outside by a discharging mechanism 14 is controlled depending on the estimated nitrogen concentration. The nitrogen concentration, for example, can be estimated from a rate of pressure drop in the fuel off-gas passage 8 during the discharge of fuel off-gas.

The invention claimed is:

1. A fuel cell system comprising:
   a fuel cell that receives a supply of fuel gas including hydrogen for generating electric power;
   a fuel off-gas passage that is a passage for discharging fuel off-gas from the fuel cell;
   a discharging mechanism that discharges the fuel off-gas from the fuel off-gas passage to outside;
   a nitrogen concentration estimation mechanism for estimating a nitrogen concentration of the fuel gas in the fuel cell from a physical quantity related to the fuel off-gas detected in the fuel off-gas passage; and
   a discharge amount control mechanism for controlling an amount of discharged fuel off-gas that is discharged by the discharging mechanism depending on the nitrogen concentration estimated by the nitrogen concentration estimation mechanism,
   wherein the nitrogen concentration estimation mechanism estimates the nitrogen concentration from a rate of pressure drop in the fuel off-gas passage during discharge of the fuel off-gas by the discharging mechanism.

2. The fuel cell system according to claim 1, wherein the discharge amount control mechanism decreases the amount of discharged fuel off-gas in proportion to an increase in the nitrogen concentration when the discharging mechanism is operated while the operation of the fuel cell is stopped.

3. The fuel cell system according to claim 1, wherein the fuel off-gas passage is connected to a fuel gas passage, which is a passage for supplying the fuel gas to the fuel cell.

4. The fuel cell system according to claim 1, wherein the discharge amount control mechanism sets an open time of a purge valve for discharging fuel off-gas to outside, and wherein the open time is increased in proportion to an increase in the nitrogen concentration of the fuel gas in the fuel cell.

5. The fuel cell system according to claim 1, wherein the nitrogen concentration estimation mechanism uses at least one among a pressure sensor that detects a pressure loss of between fuel gas entering and exiting the fuel cell, a pressure sensor that detects a pressure in the fuel off-gas passage, a hydrogen sensor that detects a hydrogen concentration in the fuel off-gas passage, an ultrasonic sensor that detects a sound velocity of fuel off-gas in the fuel off-gas passage, and a voltage monitor that detects a voltage of the fuel cell, in order to estimate the nitrogen concentration.

6. The fuel cell system according to claim 1, wherein the nitrogen concentration estimation mechanism estimates the nitrogen concentration based upon a lapsed period after performing purging to discharge fuel off-gas to outside.

7. The fuel cell system according to claim 1, wherein the nitrogen concentration estimation mechanism estimates the nitrogen concentration by operating the purge valve for discharging fuel off-gas to outside for a fixed open time in fixed cycles, and calculating a difference between a theoretical hydrogen consumption amount at that time and an actual hydrogen consumption amount.

8. The fuel cell system according to claim 1, wherein the discharge amount control mechanism controls the amount of discharged fuel off-gas in accordance with a temperature of the fuel cell.

9. The fuel cell system according to claim 1, wherein the discharge amount control mechanism controls the amount of discharged fuel off-gas in accordance with time passed after the discharge of the fuel-off gas is started.

10. The fuel cell system according to claim 1, further comprising a pressure sensor that detects the rate of pressure drop in the fuel off-gas passage, the nitrogen concentration estimation mechanism estimating the nitrogen concentration based on the rate of pressure drop detected by the pressure sensor.

11. The fuel cell system according to claim 10, wherein the nitrogen concentration estimation mechanism estimates that the nitrogen concentration is high when the rate of pressure drop is relatively slow.

12. The fuel cell system according to claim 10, wherein a single pressure sensor detects the rate of pressure drop.

13. A fuel gas control method comprising:
   supplying fuel gas including hydrogen to a fuel cell to generate power;
   discharging fuel off-gas to outside from a fuel off-gas passage that is a passage for discharging fuel off-gas from the fuel cell;
   determining a rate of pressure drop in the fuel off-gas passage during discharge of the fuel off-gas;
   estimating a nitrogen concentration of the fuel gas in the fuel cell from a physical quantity related to the fuel off-gas detected in the fuel off-gas passage based on the determined rate of pressure drop in the fuel off-gas passage during discharging; and
   controlling an amount of discharged fuel off-gas that is discharged to outside depending on the estimated nitrogen concentration.

14. The fuel gas control method according to claim 13, wherein the nitrogen concentration is estimated to be high when the rate of pressure drop is relatively slow.

15. The fuel gas control method according to claim 13, wherein the determination of the rate of pressure drop is provided by a single pressure sensor.

* * * * *